United States Patent [19]
Rowan

[11] Patent Number: 5,523,690
[45] Date of Patent: Jun. 4, 1996

[54] METAL DETECTOR WITH BIVARIATE DISPLAY

[75] Inventor: Mark D. Rowan, Lebanon, Oreg.

[73] Assignee: White's Electronics, Inc., Portland, Oreg.

[21] Appl. No.: 918,075

[22] Filed: Jul. 24, 1992

[51] Int. Cl.⁶ .......................... G01N 27/72; G01V 3/11; G01V 3/165; G01R 27/26
[52] U.S. Cl. .......................... 324/329; 324/233; 345/140
[58] Field of Search ...................... 324/326–329, 324/233, 228, 226, 262; 345/140

[56] References Cited

U.S. PATENT DOCUMENTS

| | | | |
|---|---|---|---|
| 3,648,270 | 3/1972 | Metz et al. | 345/140 |
| 3,848,182 | 11/1974 | Gerner et al. | 324/233 |
| 4,507,612 | 3/1985 | Payne | 324/329 |
| 4,631,533 | 12/1986 | Mark, Jr. | 324/233 |
| 4,742,339 | 5/1988 | Bazuik | 324/228 |
| 4,853,617 | 8/1989 | Douglas et al. | 324/329 |
| 4,868,910 | 9/1989 | Maulding | 324/233 |
| 5,148,151 | 9/1992 | Podhrasky | 324/329 |

FOREIGN PATENT DOCUMENTS

3228447  2/1984  Germany .

*Primary Examiner*—Walter E. Snow
*Attorney, Agent, or Firm*—Chernoff, Vilhauer, McClung & Stenzel

[57] ABSTRACT

A metal detector having a receive signal responsive to detected metal objects and having a display panel that can simultaneously display a plurality of phase angles associated with the receive signal. Additionally, the display panel can simultaneously display a second variable associated with the receive signal at each particular phase angle. The second variable is user selectable and can be either (1) a count of the number of times the signal amplitude exceeds a predetermined threshold level at a particular phase angle or (2) the signal amplitude when the signal is at a particular phase angle.

10 Claims, 6 Drawing Sheets

GOOD TARGET
Fig. 2b

IRON
Fig. 2e

GOOD TARGET
Fig. 2c

IRON ALLOY
Fig. 2f

GOOD TARGET
Fig. 2d

FOIL
Fig. 2g

METAL DETECTOR WITH BIVARIATE DISPLAY

FIELD OF THE INVENTION

The present invention relates to the field of metal detectors, and more particularly to a means of graphically displaying bivariate signal information that reflects signal characteristics responsive to metal objects which pass beneath a search head of the metal detector.

BACKGROUND OF THE INVENTION

An induction balanced metal detector, of the type used to locate coins, rings and other treasure buried in soil within a few feet of the surface, has a search head that houses a transmit coil and receive coil. The metal detector has circuitry that transmits a periodic signal to the transmit coil as the search head is manually swept over a ground surface to detect buried metal objects. When the transmit coil passes over a metal object, a signal is generated in the receive coil due to perturbations in the magnetic field which cause the AC inductive coupling between the transmit and receive coils to become unbalanced. These receive coil signals are responsive to target characteristics such as size, depth below the ground surface, orientation with respect to the search head, and type of metal. In order to provide the user with information about the target's characteristics, (e.g., to distinguish coins from nails), some metal detectors measure the phase angle between the transmitted signal and the received signal. This phase angle is typically displayed to the user as a number on an output device such as an analog meter or a liquid crystal display (LCD). Under ideal conditions this phase angle can provide the user with accurate information regarding the target.

However, in actual practice the phase angle information is materially affected by ground mineralization and can also be affected by the target's orientation with respect to the search head. Under either of these conditions a single sweep of the search head can, with conventional displays, produce multiple phase angle readings and thereby result in an indecipherable output. In response to this problem some metal detector designers have also provided an audio output of the received signal where the tone's frequency corresponds to the phase angle of the signal and the tone's volume corresponds to the signal strength. An example of the prior art which uses a numeric LCD to display phase angle information and which also has an audio output is Maulding, U.S. Pat. No. 4,868,910, assigned to the assignee of this invention. This recent prior art approach provides the user with more complete information regarding phase angle and signal strength, but suffers in that the information cannot be latched for careful analysis and it also depends upon the user's audio memory and ability to discern frequencies in order to determine the target's characteristics.

SUMMARY OF THE INVENTION

The present invention solves the above problems by providing a bivariate visual display of two variables that are associated with a signal induced in the receive coil of a metal detector. The two variables are: (1) the receive signal's phase angle (with respect to the transmit signal) and (2) the choice of either (a) a count of the number of occurrences in which the signal amplitude exceeds a predetermined amplitude (hereinafter, the signal count) or (b) the signal amplitude. The bivariate information is displayed on a suitable graphic device such as an LCD. This method permits the metal detector operator to readily make a visual discrimination between valid phase angle readings that represent good target information and those that are due to extraneous, non-target magnetic field perturbations.

The principal objective of the present invention is to provide a metal detector having a bivariate visual display of two signal characteristics that are representative of a target object.

It is a further objective of the present invention to provide an improved metal detector in which (a) the phase angle between the transmit and receive signals is determined only when the signal strength exceeds a predetermined level and (b) the number of times the signal amplitude exceeds the predetermined level at a predetermined range of phase angles is counted, and then simultaneously displaying both the phase angle and signal count on a visual display device.

It is a still further objective of the present invention to provide a metal detector that measures the phase angle between the transmit signal and receive signal when the signal strength exceeds a predetermined level by displaying the phase angle and received signal strength simultaneously on a visual display device.

The foregoing and other objectives, features and advantages of the present invention will be more readily understood upon consideration of the following detailed description of the invention taken in conjunction with the accompanying drawings.

BRIEF DESCRIPTION OF THE DRAWINGS

Appendix A is a source code listing of the subroutine REPORT.

DESCRIPTION OF THE PREFERRED EMBODIMENT

This invention pertains to improvements in the display of signal information generated within induction balance type metal detectors. A metal detector of this type is fully described in Maulding, U.S. Pat. No. 4,868,910 which is incorporated herein by reference for purposes of providing a complete disclosure. Before proceeding to the preferred embodiment of the present invention, it is first necessary to generally describe the operation of an induction-balanced metal detector which will be done with reference to Maulding.

An induction-balanced metal detector generally has a search head with two AC coupled, electrically conductive coils: a transmit coil and a receive coil. Maulding describes a search head with three coils; transmit, receive and a feedback coil; however, the feedback coil is not relevant to the present disclosure. (See Maulding, FIG. 1, Nos. 22, 24 and 26.) To search for buried targets, a periodic signal is applied to the transmit coil as the search head is swept over an area of ground. Under ideal conditions, i.e. proper induction balance and no magnetic field perturbations, there is no signal in the receive coil. However, when the search head passes over a target it causes a disturbance in the transmit coil's magnetic field, thereby inducing a signal in the receive coil. The transmit and receive signals are then electronically processed and applied to various output devices in an effort to measure and communicate various target characteristics. As exemplified in Maulding, the signals are processed into six components; XD, XF, YD, YF, GD and GF. Only the filtered signals XF, YF and GF are relevant to the present application. XF and YF are DC phase quadrature components of the receive and transmit signals and GF is a filtered DC signal representation of the ground mineralization effects. (See Maulding, FIG. 1 where 52, 56 and 78 represent signals XF, YF and GF, respectively.) From the XF and YF components, a receive signal phase angle is measured which is representative of the target's characteristics. (Maulding, FIGS. 2, 3; Col. 9, lines 35–50; and Col. 21, lines 27–50.) This phase angle information discloses characteristics such as type of metal, size, orientation of a ferromagnetic object with respect to the search head, and ground mineralization.

Figure 1:
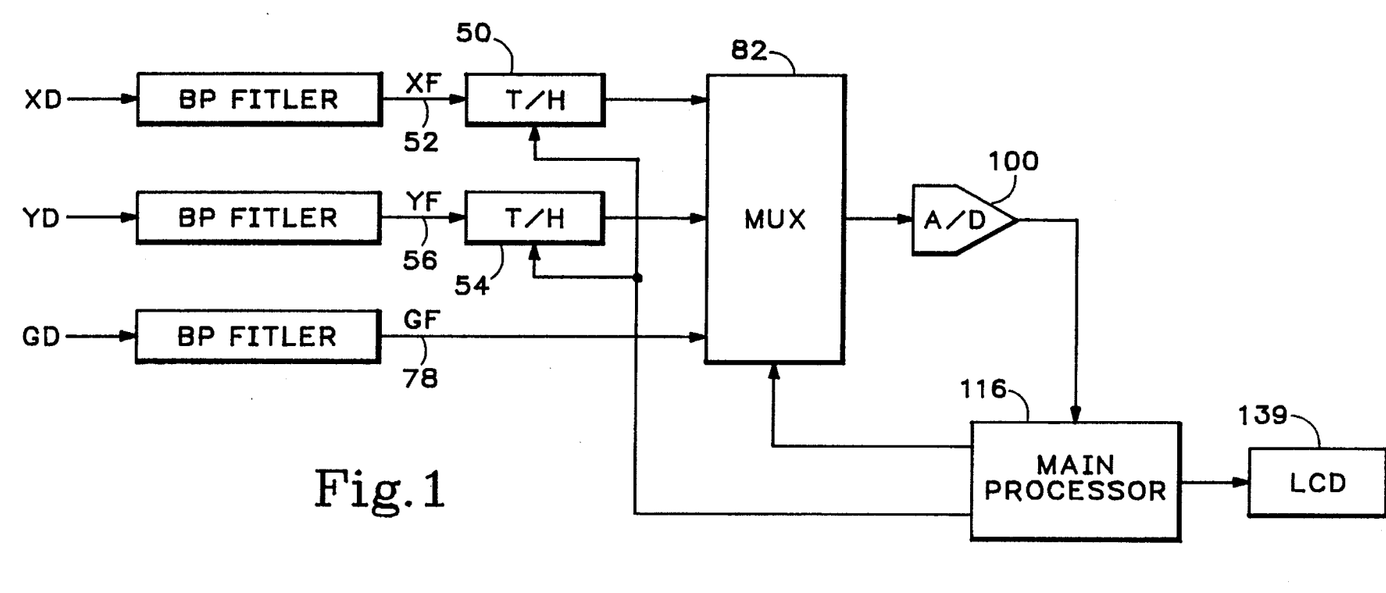
FIG. 1 is a block diagram of a portion of an exemplary metal detector circuit of the present invention.

FIG. 1 of this application shows the components of Maulding's circuit which are also in the present invention. (The reference numbers in FIG. 1 correspond to Maulding reference numbers for identical component blocks.) All the reference elements in FIG. 1 are also represented in Maulding with the important exception of LCD 139 which is materially distinct from Maulding's LCD 138.

With reference to FIG. 1, it can be seen that signals XF and YF emerge from respective band pass filters 42, 46 and are applied to respective track and hold circuits 50 and 54. Thereafter, signals XF and YF are applied to a multiplexor (MUX) 82. The signal GF emerges from a band pass filter 74 and is thereafter applied directly to MUX 82.

Reading a signal is a two-step process and fully described in Maulding (Col. 18, line 25 to Col. 19, line 3). In essence, the main processor 116 simultaneously commands track and hold circuits 50, 54 to hold the respective XF and YF signals so that the signals which are later sequentially input into the MUX represent XF and YF signals that are sampled at the same instant in time. The main processor 116 then directs MUX 82 to route selected signals to the MUX output in a predetermined sequence at a fixed sampling rate of approximately 7.5 milliseconds. The signals coming out of the MUX are applied to an analog-to-digital converter system 100 and then applied to the main processor 116. At this point the present system is different from Maulding in that the main processor then writes the information to LCD 139 in a suitable format using onboard software programming described hereinafter.

Figure 2A:
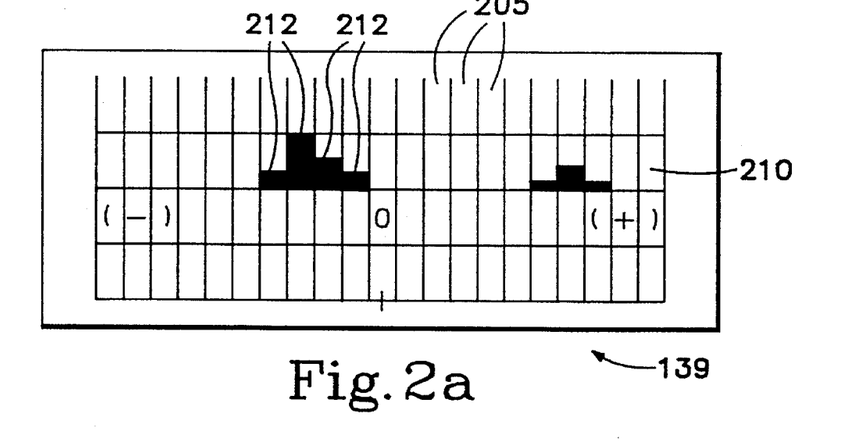
FIGS. 2a–2g show exemplary embodiments of a bivariate graphic display of the present invention showing signal information associated with a metal detector.

FIG. 2a represents a preferred embodiment of the bivariate graphical display of the present invention showing two variables of signal information displayed on LCD 139. There is a horizontal scale that is divided into a series of evenly-spaced divisions 205, each division represents a range of phase angles. A preferred embodiment of the present invention that is generally commercially available is a LCD having a 4×20 character display, which means that the horizontal axis can display 20 characters and the vertical scale can display four characters, with each character representing a range of values.

In the preferred embodiment of the display shown in each of FIGS. 2a–2g, the horizontal scale represents the relative phase angle. Each division represents a range of phase angles: where the possible range of phase angles is 180° then each division along the horizontal scale of a 4×20 LCD would represent a 9° range of phase angles. The vertical scale 210 represents a second variable which is either (1) a signal count or (2) an amplitude of the receive signal.

The signal count is a running tabulation of the number of times that a signal having a particular phase angle exceeds a predetermined threshold amplitude (e.g., the number of times that a signal with a phase angle between +20 and +29 exceeds a signal strength of 0.08 volts). Either the user or the main processor 116 selects the threshold amplitude to filter out weak signals. Each time a signal amplitude exceeds the threshold amplitude the associated phase angle is measured and the signal count for that phase angle is incremented.

The alternate variable displayed on the vertical scale is the amplitude of the receive signal. Only information associated with phase angles whose amplitude exceeds the predetermined threshold level is displayed.

The individual characters 212 used to represent the bivariate information are user definable characters which are bit-mapped into a five by eight matrix within the main processor 116 and downloaded to the LCD. The standard configuration displays the signal information as a bar graph, with a bar at respective phase angle ranges and the height of the bar is proportional to the signal count or signal amplitude (the bar height is zero where no signals correspond to a given range of phase angles).

Figures 2B, 2E:
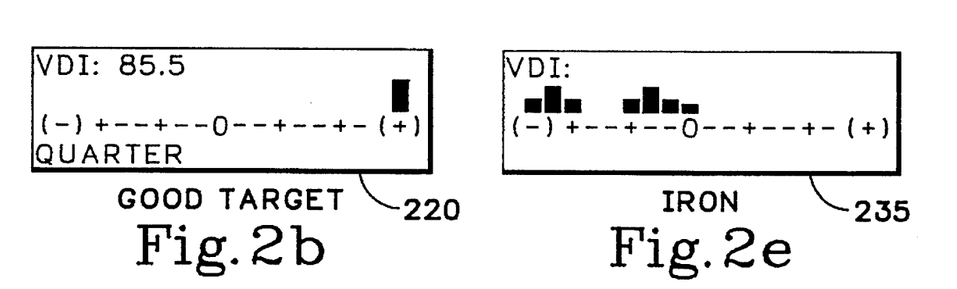
Figures 2C, 2F:
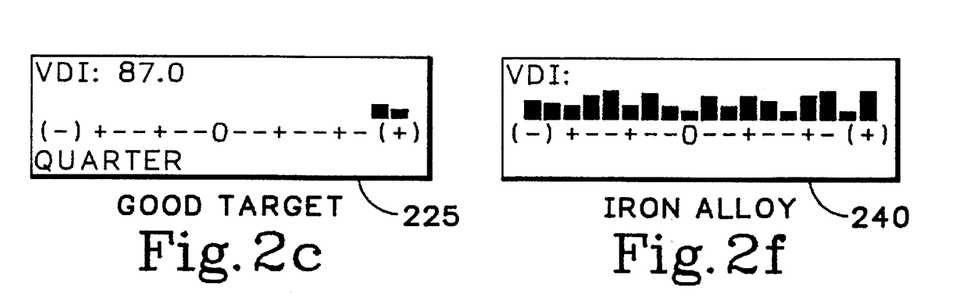
Figures 2D, 2G:
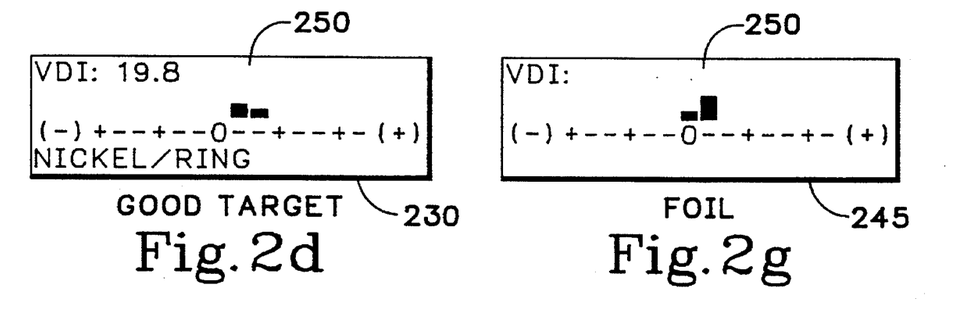

FIGS. 2b–2g are examples of the LCD display when the search head encounters various buried metals. FIGS. 2b–2d represent the display in response to "good targets," that is targets that the metal detector user may want to dig up. Good target displays are characterized by a tight grouping of bars within a narrow range of phase angles, or optimally at a single phase angle range as shown in FIG. 2b. Additionally, good targets are characterized by groupings in the positive portion of the graph; i.e., the area between the "0" and "(+)" symbols. The exemplary embodiments of FIGS. 2b–2d also show other information on the LCD such as the VDI, which is a numeric representation of the phase angle, and a textual estimate of the target, e.g., "quarter" in FIG. 2b.

FIGS. 2e–2g are exemplary embodiments of the display when the search head encounters undesirable (i.e., nonvaluable) metal targets. These graphs display signal information having phase angles that are predominately in the negative portion of the graph (between "0" and "(−)") and which typically show a signal response at a wide range of phase angles rather than the tight grouping associated with goods targets. The bivariate display is particularly helpful in deciphering those signals that are spread across a wide range of phase angles, as is shown in FIG. 2f. If the display were monovariate (e.g., a numeric LCD), the user would not be able to distinguish good targets from bad because the numeric LCD would be as likely to show a phase angle associated with a good target as with a bad one. But the bivariate display of the present invention shows the signal information as a "smear" across the display, thereby clearly communicating to the user that the target is not desirable.

The advantage of the bivariate display is also apparent in a comparison of FIG. 2g with FIG. 2d. A monovariate display would likely indicate the same phase angle for each of these targets, namely the phase angle associated with the division 250 to the immediate right of the center because the largest bar is at that location. However the bivariate display of the present invention shows information on multiple phase angles and the good target FIG. 2d has a bar to the positive side whereas the undesirable target FIG. 2g has a bar to the negative side of the largest bar. A user familiar with these displays will recognize the more positive phase angles as indicative of a good target.

Figure 3:
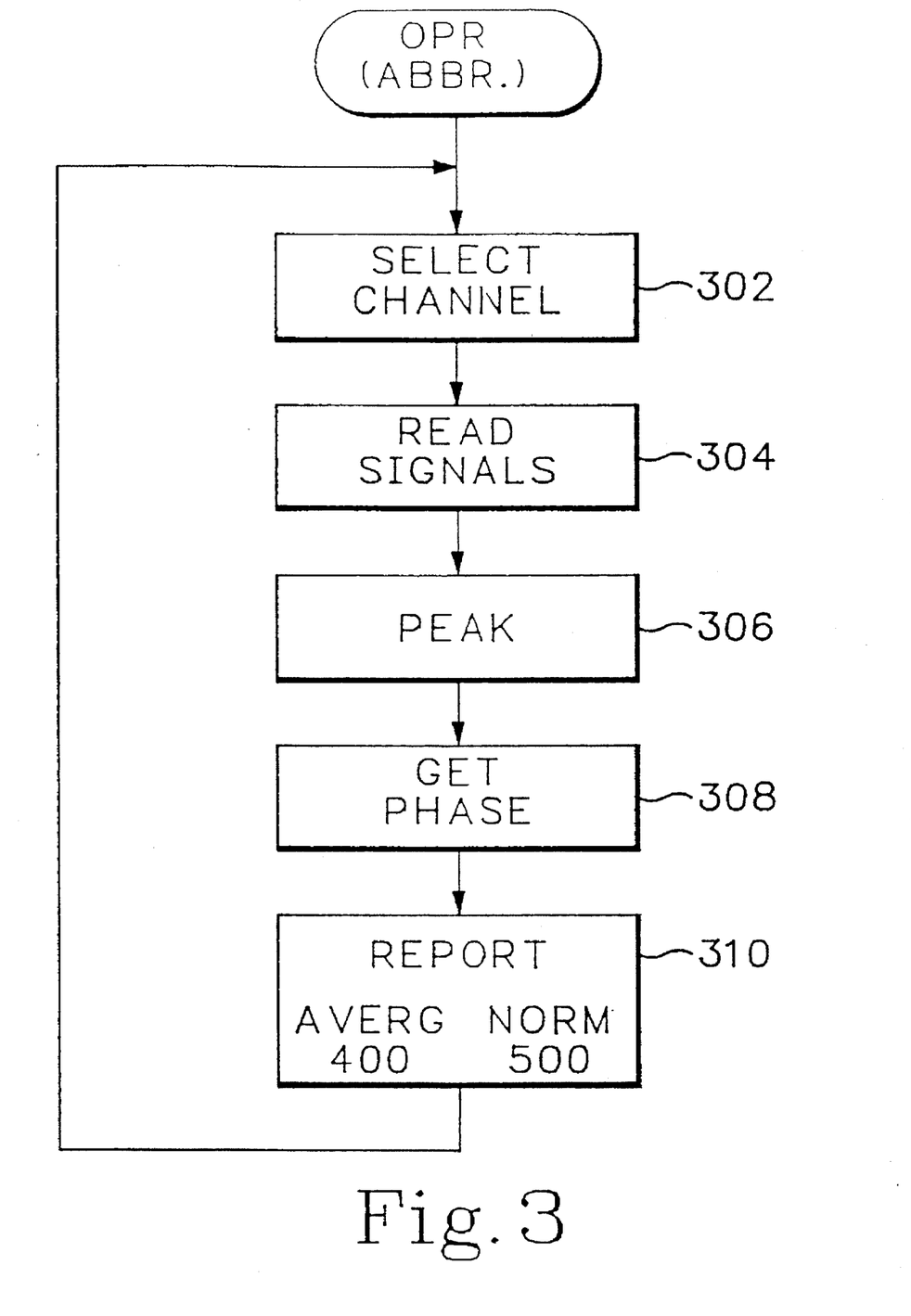
FIG. 3 is an abridged flow diagram of an exemplary software routine for processing the signals associated with the metal detector.

FIG. 3 is an abridged software flow diagram representing the steps performed by the main processor during operation of the metal detector. A more complete flow diagram showing all steps necessary for operation of a metal detector is shown in Maulding, FIG. 11. Continuing with FIG. 3 of the present invention, steps 302 and 304 represent channel selection and signal reading wherein the main processor 116 instructs the MUX 82 to route a selected channel to the MUX output pin. After reading the signals 304, the next step calls software subroutine PEAK 306, which determines whether signal GF has reached a local maximum value. (Subroutine PEAK is exemplarily shown in Maulding FIG. 16.) A "local maximum" is one that occurs within a predetermined period of time. When the main processor determines that GF has reached a local maximum, a flag "PK" is set. The next step, subroutine GETPHASE 308, calculates the phase of the receive signal from XF and YF and stores the result in a memory register "PHASE." (GETPHASE is exemplarily shown in Maulding, FIG. 18.) After GETPHASE, the software calls subroutine REPORT 310 which checks the status of flag PK and writes the signal information to the LCD when flag PK is set. (The subroutine REPORT 310 is novel to this invention and has no equivalent in Maulding.) Software module REPORT utilizes one of two routines AVERG (FIGS. 4 and 5) or NORM (FIG. 6).

Figure 4:
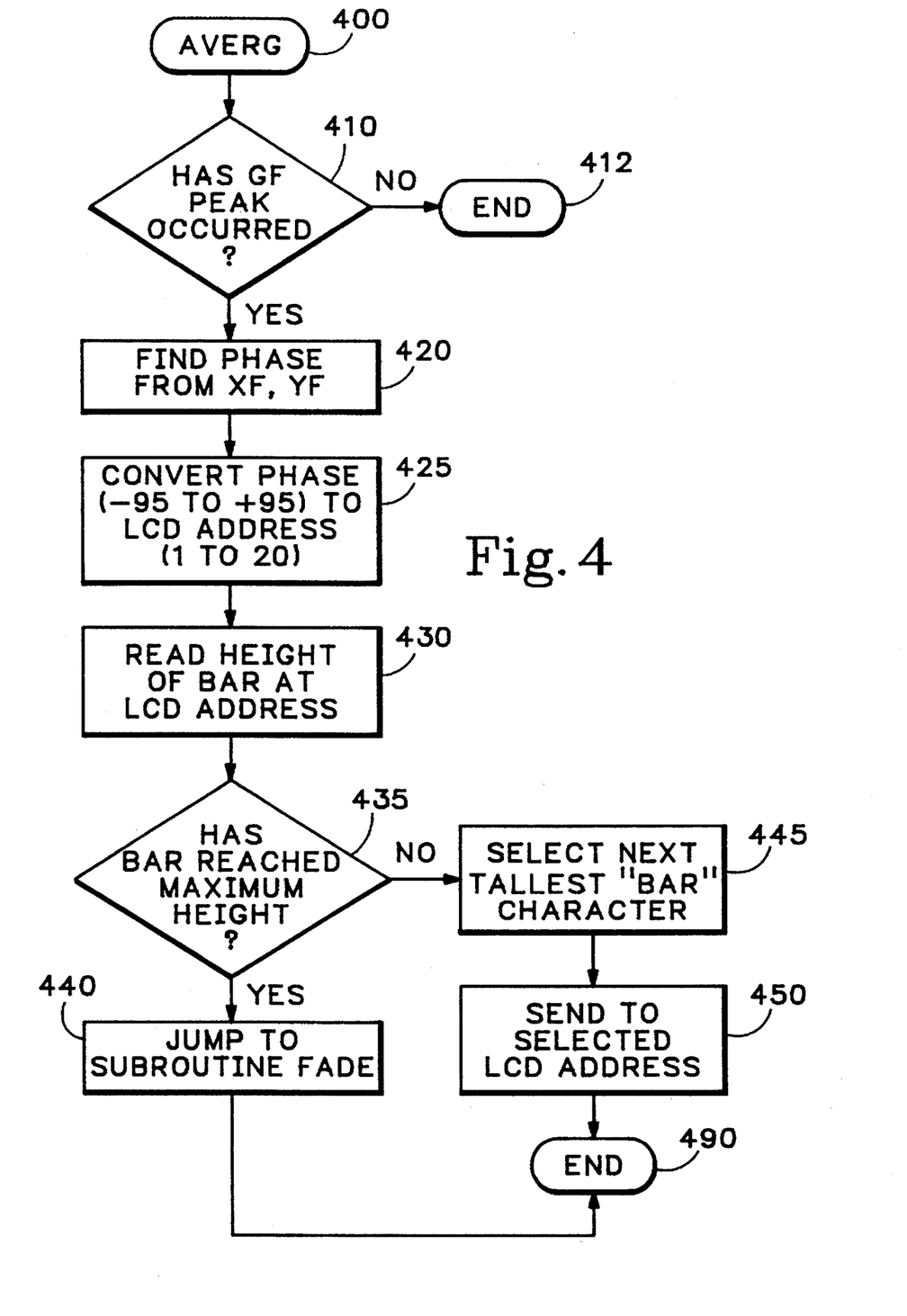
FIG. 4 is a flow diagram of an exemplary software routine that writes phase angle and signal count to the graphic display of FIG. 2.

The REPORT subroutine checks a flag "MP" to determine whether the user has selected the display mode which shows the signal count or the signal amplitude. If the user selects the signal count display, then the subroutine REPORT will branch to a routine AVERG (FIG. 4). Alternatively, if the user selects the amplitude display, then REPORT will branch to the routine NORM (FIG. 6). AVERG and NORM could be subroutines, but in the preferred embodiment they are code within the subroutine REPORT.

FIG. 4 is an exemplary flow diagram of AVERG 400 which writes signal information to the LCD. This routine determines whether a local maximum in the signal amplitude has occurred at step 410 by testing whether flag PK has been set. If PK is not set then the routine exits at 412. If flag PK is set then the routine gets the phase angle in step 420 from the memory register PHASE. In step 425 the routine converts the phase angle into an LCD "write" address. As explained above, the preferred embodiment includes a 4×20 matrix LCD display device and the phase angle is represented along the 20-character axis. Therefore, the software program converts the phase angle into a "write" address corresponding to the LCD axis by multiplying the phase angle by 20 and dividing the result by 180, effectively creating 20 ranges of phase angles of nine degrees each. The routine then reads the height of the bar at the LCD address corresponding to the "write" address at step 430 and in step 435 determines whether the bar has reached a maximum height. If the bar has not reached a maximum height then the routine writes the next taller bar character in step 445. Alternatively, if the bar is at a maximum height then the routine calls FADE at step 440.

Figure 5:
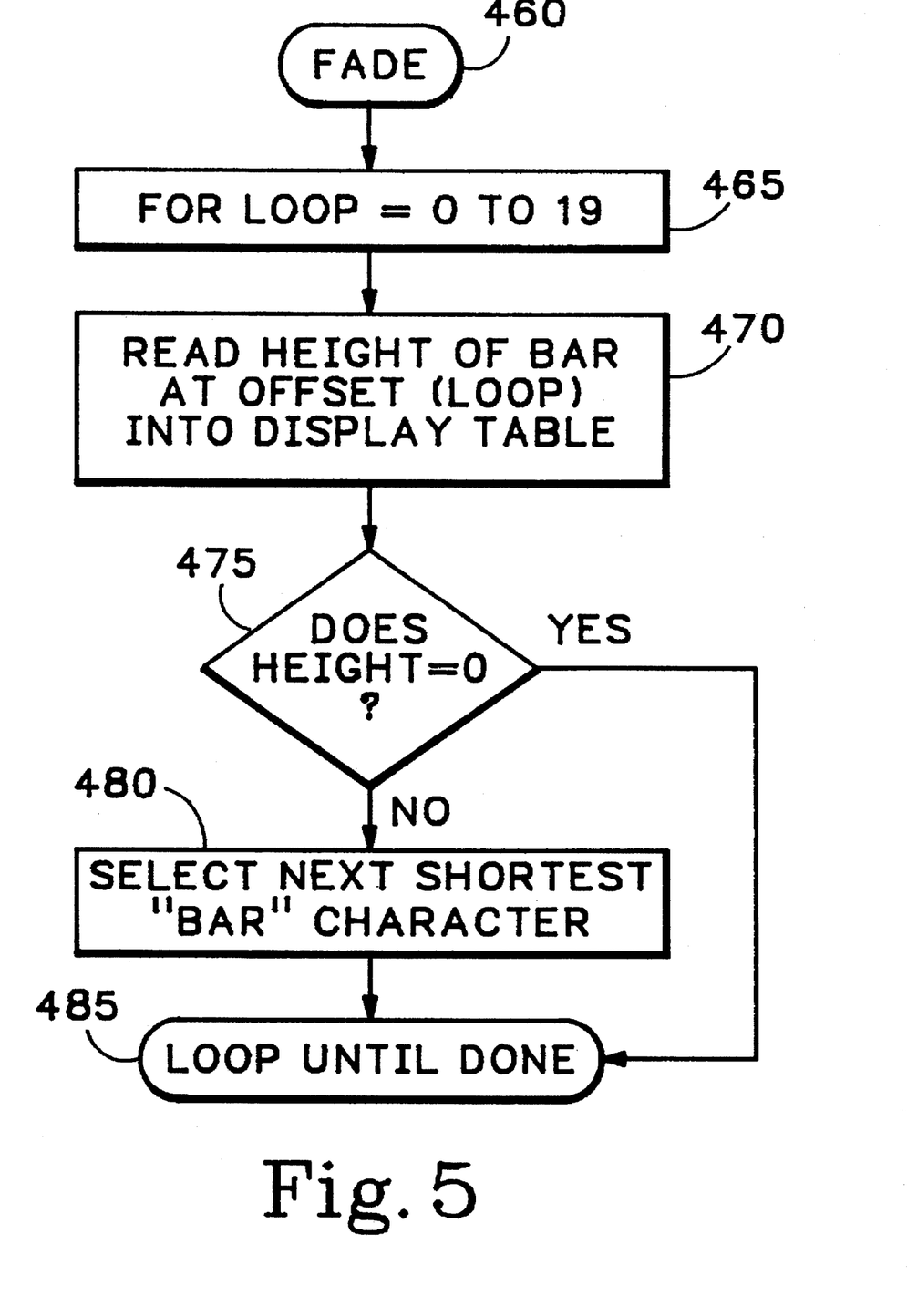
FIG. 5 is a flow diagram of an exemplary software subroutine that selects a shorter bar character associated with the graphic display device of FIG. 2.
Figure 6:
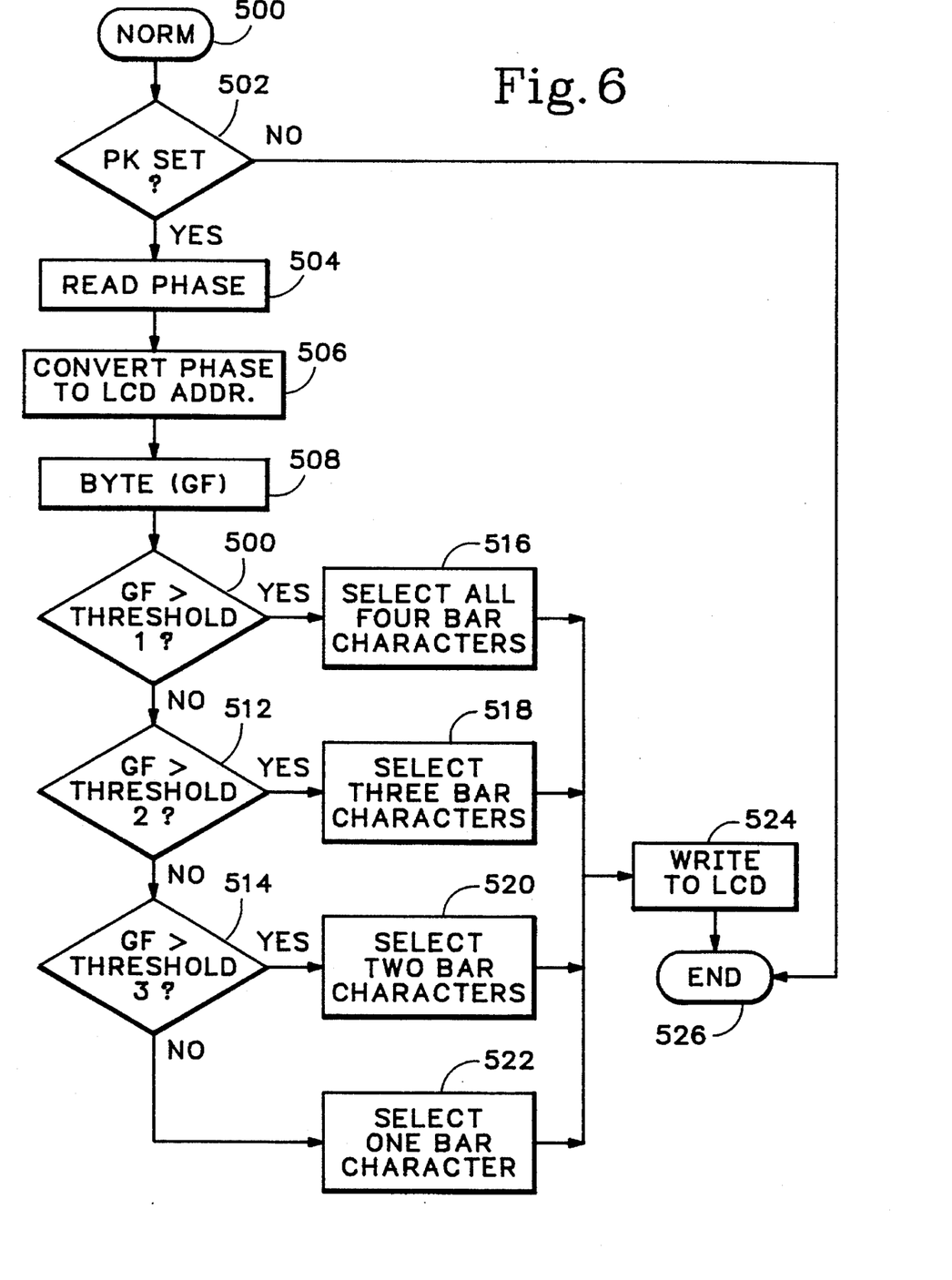
FIG. 6 is a flow diagram of an exemplary software routine that writes phase angle and amplitude information to the graphic display device of FIG. 2.

FADE 460, FIG. 5, decrements the height of all bars that are at addresses other than the "write" address. FADE loops through 20 iterations, step 465, to read the height of the bar at each address, step 470. If the height of the bar is zero then the subroutine does nothing and loops to the next bar, step 485. If the height of the bar is not zero then the subroutine selects the next shortest bar character at step 480. The subroutine loops through all the bars until each bar other than the "write" address bar is decremented (or skipped, in the case of zero height bars) at step 485. After completing the 20 iterations the subroutine FADE returns control to AVERG which terminates at step 490.

FIG. 6 is an exemplary flow diagram representation of the routine NORM 500. Upon entering NORM, the program first determines whether a local maximum in the receive signal has occurred at step 502 by testing for the flag PK. If flag PK is not set, the routine terminates at step 526. If flag PK is set, the program gets, at step 504, the phase angle of the receive signal from the memory register and converts the phase angle to an LCD "write" address 1 to 20, step 506, in the same manner as described above for routine AVERG. In the next step, the program runs a subroutine BYTE(GF) to calculate a compressed eight-bit datum representing the GF level which correlates to the receive signal amplitude. (BYTE is exemplarily disclosed in Maulding, FIG. 14.) Thereafter, the routine, at steps 510, 512 and 514, respectively, tests the eight-bit representation of the GF level against three preset, respectively decreasing thresholds designated thresholds 1, 2, and 3. If the GF level is greater than the first threshold 510, then the routine selects all four segments of the bar at step 516. If the GF level is less than threshold 1 but greater than the next lowest threshold 2, step 512, then the routine selects three of the four bar characters at step 518. If the GF level is less than threshold 2 but greater than the lowest threshold 3, step 514, then the routine selects two bar characters at step 520. If the GF level is less than threshold 3 then the routine selects one bar character at step 522. The routine then writes the information to the "write" address at step 524 and exits the subroutine at step 526.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

APPENDIX A

```
2500 A.D. 6805 CROSS ASSEMBLER   -   VERSION 3.01a
--------------------------------------------------

INPUT FILENAME : REPORT.ASM
              OUTPUT FILENAME : REPORT.OBJ

1                          NAM    REPORT  07 FEB 89/modified 7/28/89  MDR
  2                          ;;;;;;;;;;;;;;;;;;;;;;;;;;;;;;;;;;;;;;;;;;;;;;
  3                          ;OUT:TARGET DATA DISPLAYED IN AUDIO AND LCD.
  4                          ;CRITERION FOR LEARN = PK
  5                          ;CRITERION FOR AUDIO = GFLEV
  6                          ;;;;;;;;;;;;;;;;;;;;;;;;;;;;;;;;;;;;;;;;;;;;;;
  7                            PUBLIC REPORT
  8                            EXTERN AUDIO ;DOK & GOUT TO AUDW
  9                            EXTERN DISFLT ;DISCRIMINATE FILTER->DOK
 10                            EXTERN SET,CLR ;LEARN ROUTINES
 11                            EXTERN VDI,VDIAV,AVCOUNT,DISTABL,GDC,GCOUNT,IDTONE
 12                            EXTERN PAGE0 STATE,PAGE0 GHOT,PAGE0 DISPTR,PAGE0 KEY
 13                            EXTERN PAGE0 STAT ;7=LRNREJ,6=LRNACC       IN
 14                                              ;2=PK,3=TRIG,5=DISC      IN
 15                                              ;0=DOK                   OUT
 16                            EXTERN PAGE0 FLAGA ;3=DON:SET IF ACCEPT    OUT
 17                                               ;4=DOK:SET IF DISC ON   OUT
 18                                               ;2=ATH                  IN
 19                            EXTERN PAGE0 FLAGB ;6=200N                 OUT
 20                                               ;4=SIGN BIT             INT
 21                                               ;5=ATIME RUNNING        INT
 22                            EXTERN PAGE0 FLAGP ;0=ac overload
 23                            EXTERN PAGE0 GFLEV ;DATA FROM PEAK         IN
 24                            EXTERN PAGE0 GFAMP ; abs(compressed(GF))
 25                            EXTERN PAGE0 DISLEV ;DISC. DATA TO AUDIO   OUT
 26                            EXTERN PAGE0 ACSENS ;USED FOR SHIFTS       IN
 27                            EXTERN PAGE0 PHASE ;GB                     IN
 28                            EXTERN PAGE0 PHRAC
 29                            EXTERN PAGE0 TEMA  ;STASH                  INT
 30                            EXTERN PAGE0 OPTST ;RAM TEST ADDRESS       IN
 31                            EXTERN PAGE0 ATIME ;RECOVERY HOLD OFF      INT
 32                            EXTERN PAGE0 RECOV ;user adj. hold off
 33                            EXTERN PAGE0 VDISENS,PAGE0 FADERATE,PAGE0 FADECOUNT
 34                            EXTERN PAGE0 GCREJ
 35                            EXTERN PAGE0 SIGBAL
 36                            EXTERN PAGE0 STATTABL
 37                            EXTERN PAGE0 TFREQ
 38                            EXTERN PAGE0 FLAG4
 39                            EXTERN DIVIDE
 40                            EXTERN CLRDATA,FADE,LABEL,CLRVDI
 41                          ;;;;;;;;;;;;;;;;;;;;;;;;;;;;;;;;;;;;;;;;;;;;;;
 42  0000  07 00 7D   REPORT BRCLR  3,STAT,SEARCH ;GO IF NO TRIGGER
 43
 44                          ;;;;;;;;;;;;;;;;;;;;;;;;;;;;;;;;;;;;;;;;;;;;;;
 45                          ; TRIGGER PRESSED (PINPOINTING MODE)        ;
 46                          ;;;;;;;;;;;;;;;;;;;;;;;;;;;;;;;;;;;;;;;;;;;;;;
 47  0003  B6 09              LDA    DISPTR
 48  0005  A1 1C              CMP    #28
```

```
49  0007  26 69              BNE     JWR
50  0009  B6 00              LDA     SIGBAL
51  000B  44                 LSRA
52  000C  44                 LSRA
53  000D  40                 NEGA
54  000E  AB 14              ADD     #20
55  0010  97                 TAX              ;x in range 17 -- 20
56  0011  B6 00              LDA     TFREQ
57  0013  A0 04              SUB     #4
58  0015  2A 02              BPL     SCALE2
59  0017  40                 NEGA
60  0018  5C                 INCX
61  0019  27 04     SCALE2   BEQ     SCALE3
62  001B  5C                 INCX
63  001C  4A                 DECA
64  001D  20 FA              BRA     SCALE2
65  001F  0A 07 03  SCALE3   BRSET   5,STATTABL+7,SCALE4
66  0022  5C                 INCX
67  0023  5C                 INCX
68  0024  5C                 INCX
69  0025  B6 00     SCALE4   LDA     GHOT
70  0027  2A 01              BPL     SCALEIT
71  0029  4F                 CLRA
72  002A  A1 78     SCALEIT  CMP     #120
73  002C  25 04              BLO     SCALIT2
74  002E  A6 13              LDA     #19
75  0030  20 0B              BRA     SHOWIT
76  0032  42        SCALIT2  MUL
77  0033  BF 00              STX     TEMA
78  0035  AE 07              LDX     #7
79  0037  34 00     SCLOOP   LSR     TEMA
80  0039  46                 RORA
81  003A  5A                 DECX
82  003B  26 FA              BNE     SCLOOP
83  003D  A1 13     SHOWIT   CMP     #19
84  003F  23 02              BLS     INDXOK
85  0041  A6 13              LDA     #19
86  0043  97        INDXOK   TAX
87  0044  A6 02              LDA     #2
88  0046  D7 00 0F           STA     DISTABL+15,X
89  0049  BF 00              STX     TEMA
90  004B  5C        MRKRLOOP INCX
91  004C  A3 14              CPX     #20
92  004E  24 10              BHS     BARIT
93  0050  D6 00 0F           LDA     DISTABL+15,X
94  0053  A1 20              CMP     #32
95  0055  27 09              BEQ     BARIT
96  0057  A6 A1              LDA     #A1H
97  0059  D7 00 0F           STA     DISTABL+15,X
98  005C  A3 13              CPX     #19
99  005E  25 EB              BLO     MRKRLOOP
100 0060  5F        BARIT    CLRX
101 0061  A6 02              LDA     #2
102 0063  B3 00     BARLOOP  CPX     TEMA
103 0065  27 06              BEQ     DOPTST
104 0067  D7 00 0F           STA     DISTABL+15,X
105 006A  5C                 INCX
```

```
106  006B  20 F6              BRA     BARLOOP
107  006D  B6 00      DCPTST  LDA     PHASE
108  006F  02 08 60           BRSET   1,STATTABL+8,SIGN?
109  0072  CC 01 EC   JWR     JMP     WRITE        ;UPDATE AUDIO & RTN
110  0075  A6 10      SETFADE LDA     #16
111  0077  B0 00              SUB     FADERATE     ;1 (min) - 15 (max)
112  0079  48                 LSLA
113  007A  48                 LSLA
114  007B  48                 LSLA
115  007C  48                 LSLA
116  007D  B7 00              STA     FADECOUNT
117  007F  81                 RTS
118                 ;***********************************************
119                 ;*  TRIGGER RELEASED (SEARCH MODE)             *
120                 ;***********************************************
121
122  0080  01 00 0D   SEARCH  BRCLR   0,STATE,NOFADE
123  0083  3D 00              TST     FADERATE
124  0085  27 09              BEQ     NOFADE
125  0087  3A 00              DEC     FADECOUNT
126  0089  26 05              BNE     NOFADE
127  008B  AD E8              BSR     SETFADE
128  008D  CD 00 00           JSR     FADE
129  0090  CD 00 00   NOFADE  JSR     DISFLT       ;UPDATE DDK
130                 ;check for valid time to do peak processes
131  0093  05 00 05           BRCLR   2,STAT,NOTPK ;GO,NOT PEAK
132  0096  07 00 02           BRCLR   3,FLAG4,NOTPK ;GO,NOT DOD
133  0099  20 12              BRA     PEAK
134  009B  CD 00 00   NOTPK   JSR     LABEL
135  009E  C6 00 00           LDA     VDI
136  00A1  A1 64              CMP     #100         ;if overload or low bat showing
137  00A3  24 05              BHS     JNP          ;..don't defeat label update
138  00A5  A6 66              LDA     #102         ;"no label" code
139  00A7  C7 00 00           STA     VDI
140  00AA  CC 01 70   JNP     JMP     NOTPK2
141                 ;***********************************************
142                 ;* PEAK PROCESSES: DO AT PEAK OF EACH WAVE     *
143                 ;***********************************************
144  00AD  02 0A 08   PEAK    BRSET   1,STATTABL+10,NOCLEAR  ;test single sweep/accum.
145  00B0  01 00 05           BRCLR   0,FLAG4,NOCLEAR
146  00B3  11 00              BCLR    0,FLAG4
147  00B5  CD 00 00           JSR     CLRDATA
148  00B8  AD BB      NOCLEAR BSR     SETFADE
149  00BA  B6 00              LDA     PHASE
150  00BC  C7 00 00           STA     VDI
151  00BF  C7 00 00           STA     IDTONE
152  00C2  0B 08 0D           BRCLR   5,STATTABL+8,SIGN?  ;skip test if vis. disc. off
153  00C5  00 00 0A           BRSET   0,STAT,SIGN?        ;accept targ.?
154  00C8  CD 00 00           JSR     CLRVDI
155  00CB  A6 67              LDA     #103
156  00CD  C7 00 00           STA     VDI
157  00D0  20 37              BRA     SPECTM
158  00D2  2A 08      SIGN?   BPL     PGSVDI
159  00D4  40                 NEGA
160  00D5  AE 2D              LDX     #2DH
161  00D7  CF 00 01           STX     DISTABL+1
162  00DA  20 05              BRA     DOVNUM
```

```
163  00DC  AE 20       POSVDI LDX    #32
164  00DE  CF 00 01           STX    DISTABL+1
165  00E1  AE 0A       DGVNUM LDX    #10
166  00E3  CD 00 00           JSR    DIVIDE
167  00E6  AB 30              ADD    #30H
168  00E8  C7 00 02           STA    DISTABL+2
169  00EB  9F                 TXA
170  00EC  AB 30              ADD    #30H
171  00EE  C7 00 03           STA    DISTABL+3
172  00F1  A6 2E              LDA    #2EH
173  00F3  C7 00 04           STA    DISTABL+4
174  00F6  B6 00              LDA    PHRAC
175  00F8  AB 30              ADD    #30H
176  00FA  C7 00 05           STA    DISTABL+5
177  00FD  A6 1C              LDA    #28
178  00FF  B7 00              STA    DISPTR
179  0101  1F 00              BCLR   7,FLAG4
180  0103  07 00 03           BRCLR  3,STAT,SPECTM
181  0106  CC 01 EC           JMP    WRITE
182  0109  5F          SPECTM CLRX
183  010A  B6 00              LDA    PHASE
184  010C  AB 60              ADD    #96         ;nm'lize to -96 @ 0
185  010E  B7 00              STA    TEMA
186  0110  4F                 CLRA
187  0111  AB 0A       VLOOP  ADD    #10
188  0113  B1 00              CMP    TEMA
189  0115  24 03              BHS    DISBAR
190  0117  5C                 INCX
191  0118  20 F7              BRA    VLOOP
192  011A  04 0A 21    DISBAR BRSET  2,STATTABL+10,AVERG
193
194                          ;"normal" mode -- scale bar height by gf amp.
195  011D  B6 00              LDA    GFAMP
196  011F  2A 01              BPL    COMP64
197  0121  40                 NEGA
198  0122  A1 6B       COMP64 CMP    #6BH
199  0124  25 04              BLO    COMP40
200  0126  A6 02              LDA    #2
201  0128  20 35              BRA    STASH
202  012A  A1 4B       COMP40 CMP    #4BH
203  012C  25 04              BLO    COMP18
204  012E  A6 03              LDA    #3
205  0130  20 2D              BRA    STASH
206  0132  A1 3B       COMP18 CMP    #3BH
207  0134  25 04              BLO    SHORT
208  0136  A6 04              LDA    #4
209  0138  20 25              BRA    STASH
210  013A  A6 5F       SHORT  LDA    #5FH
211  013C  20 21              BRA    STASH
212
213                          ;"average" mode -- count hits and show distribution
214  013E  D6 00 0F    AVERG  LDA    DISTABL+15,X
215  0141  A1 20              CMP    #20H
216  0143  26 04              BNE    COMP5F
217  0145  A6 5F              LDA    #5FH
218  0147  20 16              BRA    STASH
219  0149  A1 5F       COMP5F CMP    #5FH
```

```
220   014B   26 04              BNE      COMP2
221   014D   A6 04              LDA      #4
222   014F   20 0E              BRA      STASH
223   0151   A1 02       COMP2  CMP      #2
224   0153   26 09              BNE      NEXTSES
225   0155   BF 00              STX      TEMA
226   0157   CD 00 00           JSR      FADE
227   015A   BE 00              LDX      TEMA
228   015C   A6 03              LDA      #3
229   015E   4A          NEXTSES DECA
230   015F   D7 00 0F    STASH  STA      DISTABL+15,X
231
232                             LEARN ;modify memory based upon [phase]
233   0162   0D 0A 05           BRCLR    6,STATTABL+10,LRN1 ;GO NOT LRNREJ
234   0165   CD 00 00           JSR      SET
235   0168   20 06              BRA      LRNEND
236   016A   0B 0A 03    LRN1   BRCLR    5,STATTABL+10,LRNEND ;GO,NOT LRNACC
237   016D   CD 00 00           JSR      CLR
238   0170                      LRNEND
239
240   0170                      NOTPK2
241                             *************************************************
242                             * THE FOLLOWING OCCURS EVERY CYCLE              *
243                             *************************************************
244
245                             *************************************************
246                             * WEIGHT GFLEV FOR NORMAL OR HIGH GAIN          *
247                             * IN:GFLEV (0-128)                              *
248                             * OUT:A,TEMA=WEIGHTED GFLEV (0-129)             *
249                             *************************************************
250   0170   B6 00              LDA      GFLEV
251   0172   27 0A              BEQ      WGFEND    ;STAY AT 0 IF 0
252   0174   BE 00              LDX      ACSENS
253   0176   A3 41              CPX      #65
254   0178   24 04              BHS      WGFEND
255   017A   44                 LSRA
256   017B   26 01              BNE      WGFEND
257   017D   4C                 INCA
258   017E   B7 00       WGFEND STA      TEMA
259                             *************************************************
260                             * ATIME CONTROL SYSTEM
261                             * IN:2,FLAGA (ATH) RESETS ATIME
262                             *OUT:5,FLAGB SET IF ATIME RUNNING
263                             *************************************************
264   0180   1B 00              BCLR     5,FLAGB   ;ASSUME NO ATIME
265   0182   05 00 07           BRCLR    2,FLAGA,NOATH
266                             ;if ath detected, reset atime with app. value
267   0185   A6 32              LDA      #50
268   0187   B0 00              SUB      RECOV     ; 40 (max) - 1 (min)
269   0189   44                 LSRA                ;range: 5 - 24
270   018A   B7 00              STA      ATIME
271   018C   3D 00       NOATH  TST      ATIME     ;CHECK IF RUNNING
272   018E   26 04              BNE      DECIT
273   0190   10 00              BSET     0,FLAGA
274   0192   20 04              BRA      ATEND
275   0194   3A 00       DECIT  DEC      ATIME     ;SERVICE ATIME &
276   0196   1A 00              BSET     5,FLAGB   ; SET FLAG
```

```
277  0198                   ATEND
278                         ;;;;;;;;;;;;;;;;;;;;;;;;;;;;;;;;;;;;;;;;;;;;;
279                         ; DECREASE DISLEV UNLESS ATIME
280                         ;OUT:DISLEV=0 IF ATIME OVER
281                         ;;;;;;;;;;;;;;;;;;;;;;;;;;;;;;;;;;;;;;;;;;;;;
282                         ;skip decrease if atime running
283  0198  0A 00 06                BRSET  5,FLAGB,DECEND  ;GO IF ATIME
284  019B  37 00                   ASR    DISLEV
285  019D  2A 02                   BPL    DECEND
286  019F  3C 00                   INC    DISLEV       ;FORCE NEG CONVERGENCE
287  01A1                   DECEND
288                         ;;;;;;;;;;;;;;;;;;;;;;;;;;;;;;;;;;;;;;;;;;;;;
289                         ; ADD GFLEV TO DISLEV                        ;
290                         ; IN:  DISLEV (SB)                           ;
291                         ; IN:TEMA=WEIGHTED, (OB)                     ;
292                         ;;;;;;;;;;;;;;;;;;;;;;;;;;;;;;;;;;;;;;;;;;;;;
293                         ;skip add if not atime
294  01A1  0B 00 37                BRCLR  5,FLAGB,ADDEND
295                         ;get ready, and branch to appropriate routine
296  01A4  B6 00            ADDUP  LDA    DISLEV
297  01A6  AB 80                   ADD    #80H         ;A=DISLEV (OB)
298  01A8  00 00 16                BRSET  0,STAT,ACC   ;GO IF ACCEPT
299                         ;reject target... A=dislev-adj gflev,clip @ 0
300  01AB  00 00 0E                BRSET  0,FLAGP,SUBIT   ;test ac overload
301  01AE  0E 00 0B                BRSET  7,PHASE,SUBIT   ;don't bias pos. phase reponses
302  01B1  97                      TAX                 ;x has dislev
303  01B2  B6 00                   LDA    BCREJ        ;1 (min) - 20 (max)
304  01B4  44                      LSRA                ;0 - 10
305  01B5  B1 00                   CMP    TEMA         ;clip?
306  01B7  25 02                   BLO    GFOK
307  01B9  B7 00                   STA    TEMA         ;clip above min. neg. excursion
308  01BB  9F               GFOK   TXA
309  01BC  B0 00            SUBIT  SUB    TEMA         ;A=DISLEV-ADJ GFLEV (OB)
310  01BE  24 17                   BCC    NOCLIP       ;CLIP IF OVERFLOW
311  01C0  4F                      CLRA                ;CLIP @ 0
312                         ;accept target... A=dislev+adj gflev
313  01C1  00 00 0D         ACC    BRSET  0,FLAGP,ADDIT   ;test ac overload
314  01C4  97                      TAX                 ;x has dislev
315  01C5  A6 18                   LDA    #24          ;bcrej: 1 (min) - 20 (max)..
316  01C7  B0 00                   SUB    BCREJ        ;23 - 4
317  01C9  48                      LSLA                ;46 (min) - 8 (max)
318  01CA  B1 00                   CMP    TEMA         ;clip?
319  01CC  22 02                   BHI    GFOK2
320  01CE  B7 00                   STA    TEMA         ;clip below max. pos. excursion
321  01D0  9F               GFOK2  TXA
322  01D1  BB 00            ADDIT  ADD    TEMA
323                         ;clip at full scale
324  01D3  24 02                   BCC    NOFS         ;CLIP IF OVERFLOW
325  01D5  A6 FF                   LDA    #0FFH
326  01D7                   NOFS
327                         ;finish processing A into dislev....
328  01D7                   NOCLIP
329  01D7  A0 80                   SUB    #80H         ;CONVERT SB
330  01D9  B7 00                   STA    DISLEV       ;POSSIBLY REDUNDANT
331  01DB                   ADDEND
332                         ;;;;;;;;;;;;;;;;;;;;;;;;;;;;;;;;;;;;;;;;;;;;;
333                         ; RIG UP DON AND DOD FROM DISLEV             ;
```

```
334                        * IN:   DISLEV                                  *
335                        *OUT: DOD=1 IF (DISLEV)>VDISENS(DATA PRESENT)*
336                        *OUT: DON=1 IF DISLEV >0 (ACCEPT)              *
337                        ***********************************************
338   01DB   18 00              BSET   4,FLAGA    ;DON (SET IF ACCEPT)
339   01DD   17 00              BCLR   3,FLAGA    ;DOD (SET IF DISC ON)
340   01DF   2A 03              BPL    RPT1       ;GO IF PLUS
341   01E1   40                 NEGA
342   01E2   19 00              BCLR   4,FLAGA    ;DON CLEAR=REJ
343   01E4   BB 00       RPT1   ADD    VDISENS    ;vdi sens.: 1 (min) - 99 (max)
344   01E6   A1 64              CMP    #100
345   01E8   25 02              BLO    RPT2       ;GO IF <THRESHOLD
346   01EA   16 00              BSET   3,FLAGA    ;DOD: ENABLE DISCRIM.
347   01EC               RPT2
348                        ***********************************************
349                        * ALWAYS UPDATE AUDIO AND DISPLAY.             *
350                        ***********************************************
351   01EC               WRITE
352   01EC   CD 00 00           JSR    AUDIO      ;DO AUDIO
353   01EF   81                 RTS               ;END OF REPORT
354                        ***********************************************
355   01F0                      END
```

###### CROSS REFERENCE TABLE ############

| Name | Addr | | Refs | | | | | | | | | | |
|---|---|---|---|---|---|---|---|---|---|---|---|---|---|
| ACC | 01C1 | : | 298 | | | | | | | | | | |
| ACSENS | EXTERN | : | 252 | | | | | | | | | | |
| ADDEND | 01DB | : | 294 | | | | | | | | | | |
| ADDIT | 01D1 | : | 313 | | | | | | | | | | |
| ADDUP | 01A4 | : | | | | | | | | | | | |
| ATEND | 0198 | : | 274 | | | | | | | | | | |
| ATIME | EXTERN | : | 270 | 271 | 275 | | | | | | | | |
| AUDIO | EXTERN | : | 352 | | | | | | | | | | |
| AVCOUNT | EXTERN | : | | | | | | | | | | | |
| AVERG | 013E | : | 192 | | | | | | | | | | |
| BARIT | 0060 | : | 92 | 95 | | | | | | | | | |
| BARLOOP | 0063 | : | 106 | | | | | | | | | | |
| BCREJ | EXTERN | : | 303 | 316 | | | | | | | | | |
| CLR | EXTERN | : | 237 | | | | | | | | | | |
| CLRDATA | EXTERN | : | 147 | | | | | | | | | | |
| CLRVDI | EXTERN | : | 154 | | | | | | | | | | |
| COMP18 | 0132 | : | 203 | | | | | | | | | | |
| COMP2 | 0151 | : | 220 | | | | | | | | | | |
| COMP40 | 012A | : | 199 | | | | | | | | | | |
| COMP5F | 0149 | : | 216 | | | | | | | | | | |
| COMP64 | 0122 | : | 196 | | | | | | | | | | |
| DCPTST | 006D | : | 103 | | | | | | | | | | |
| DECEND | 01A1 | : | 283 | 285 | | | | | | | | | |
| DECIT | 0194 | : | 272 | | | | | | | | | | |
| DISBAR | 011A | : | 189 | | | | | | | | | | |
| DISFLT | EXTERN | : | 129 | | | | | | | | | | |
| DISLEV | EXTERN | : | 284 | 286 | 296 | 330 | | | | | | | |
| DISPTR | EXTERN | : | 47 | 178 | | | | | | | | | |
| DISTABL | EXTERN | : | 88 | 93 | 97 | 104 | 161 | 164 | 168 | 171 | 173 | 176 | 214 | 230 |
| DIVIDE | EXTERN | : | 166 | | | | | | | | | | |
| DOWNUH | 00E1 | : | 162 | | | | | | | | | | |
| FADE | EXTERN | : | 128 | 226 | | | | | | | | | |
| FADECOUNT | EXTERN | : | 116 | 125 | | | | | | | | | |
| FADERATE | EXTERN | : | 111 | 123 | | | | | | | | | |
| FLAG4 | EXTERN | : | 145 | 146 | 179 | 273 | | | | | | | |
| FLAGA | EXTERN | : | 132 | 265 | 338 | 339 | 342 | 346 | | | | | |
| FLAGB | EXTERN | : | 264 | 274 | 283 | 294 | | | | | | | |
| FLAGP | EXTERN | : | 300 | 313 | | | | | | | | | |
| GCOUNT | EXTERN | : | | | | | | | | | | | |
| GDC | EXTERN | : | | | | | | | | | | | |
| GFAMP | EXTERN | : | 195 | | | | | | | | | | |
| GFLEV | EXTERN | : | 250 | | | | | | | | | | |
| GFOK | 01BB | : | 306 | | | | | | | | | | |
| GFOK2 | 01D0 | : | 319 | | | | | | | | | | |
| GHOT | EXTERN | : | 69 | | | | | | | | | | |
| IDTONE | EXTERN | : | 151 | | | | | | | | | | |
| INDIOX | 0043 | : | 84 | | | | | | | | | | |
| JNP | 00AA | : | 137 | | | | | | | | | | |
| JWR | 0072 | : | 49 | | | | | | | | | | |
| KEY | EXTERN | : | | | | | | | | | | | |
| LABEL | EXTERN | : | 134 | | | | | | | | | | |
| LEARN | 0162 | : | | | | | | | | | | | |
| LRN1 | 016A | : | 233 | | | | | | | | | | |
| LRNEND | 0170 | : | 235 | 236 | | | | | | | | | |

| | | | | | | | | | | | |
|---|---|---|---|---|---|---|---|---|---|---|---|
| MRKRLOOP | 004B : | 99 | | | | | | | | | |
| NEXTSEG | 015E : | 224 | | | | | | | | | |
| NOATH | 018C : | 265 | | | | | | | | | |
| NOCLEAR | 00BB : | 144 | 145 | | | | | | | | |
| NOCLIP | 01D7 : | 310 | | | | | | | | | |
| NOFADE | 0090 : | 122 | 124 | 126 | | | | | | | |
| NOFS | 01D7 : | 324 | | | | | | | | | |
| NOTPK | 009B : | 131 | 132 | | | | | | | | |
| NOTPK2 | 0170 : | 140 | | | | | | | | | |
| OPTST | EXTERN : | | | | | | | | | | |
| PEAK | 00AD : | 133 | | | | | | | | | |
| PHASE | EXTERN : | 107 | 149 | 183 | 301 | | | | | | |
| PHRAC | EXTERN : | 174 | | | | | | | | | |
| PDSVD1 | 00DC : | 138 | | | | | | | | | |
| RECOV | EXTERN : | 268 | | | | | | | | | |
| REPORT | 0000 : | 7 | | | | | | | | | |
| RPT1 | 01E4 : | 340 | | | | | | | | | |
| RPT2 | 01EC : | 345 | | | | | | | | | |
| SCALE2 | 0019 : | 58 | 64 | | | | | | | | |
| SCALE3 | 001F : | 61 | | | | | | | | | |
| SCALE4 | 0025 : | 65 | | | | | | | | | |
| SCALEIT | 002A : | 70 | | | | | | | | | |
| SCALIT2 | 0032 : | 73 | | | | | | | | | |
| SCLOOP | 0037 : | 82 | | | | | | | | | |
| SEARCH | 0080 : | 42 | | | | | | | | | |
| SET | EXTERN : | 234 | | | | | | | | | |
| SETFADE | 0075 : | 127 | 148 | | | | | | | | |
| SHORT | 013A : | 207 | | | | | | | | | |
| SHOWIT | 003D : | 75 | | | | | | | | | |
| SIGBAL | EXTERN : | 50 | | | | | | | | | |
| SIGN? | 00D2 : | 108 | 152 | 153 | | | | | | | |
| SPECTM | 0109 : | 157 | 180 | | | | | | | | |
| STASH | 015F : | 201 | 203 | 209 | 211 | 218 | 222 | | | | |
| STAT | EXTERN : | 42 | 131 | 153 | 180 | 296 | | | | | |
| STATE | EXTERN : | 122 | | | | | | | | | |
| STATTABL | EXTERN : | 63 | 108 | 144 | 152 | 192 | 233 | 236 | | | |
| SUBIT | 01BC : | 300 | 301 | | | | | | | | |
| TEMA | EXTERN : | 77 | 79 | 89 | 102 | 185 | 188 | 225 | 227 | 258 | 305 | 307 | 309 |
| 318 | | | | | | | | | | | |
| | | 320 | 322 | | | | | | | | |
| TFREQ | EXTERN : | 36 | | | | | | | | | |
| VDI | EXTERN : | 135 | 139 | 150 | 156 | | | | | | |
| VDIAV | EXTERN : | | | | | | | | | | |
| VDISENS | EXTERN : | 343 | | | | | | | | | |
| VLOOP | 0111 : | 191 | | | | | | | | | |
| WBFEND | 017E : | 251 | 254 | 256 | | | | | | | |
| WRITE | 01EC : | 109 | 181 | | | | | | | | |

LINES ASSEMBLED : 355          ASSEMBLY ERRORS : 0

What is claimed is:

1. An apparatus for displaying signal information associated with a receive signal in a metal detector, comprising:
   (a) means for receiving a phase angle associated with said receive signal;
   (b) means for receiving a signal amplitude value associated with said receive signal;
   (c) means for establishing a receive signal amplitude threshold;
   (d) means for detecting and counting the number occurrences that the receive signal exceeds said receive signal amplitude threshold;
   (e) first means for displaying simultaneously phase angle and signal amplitude information on a display unit;
   (f) second means for displaying simultaneously phase angle and said number of occurrences on a display unit; and
   (g) means for switching between said first and second display means.

2. The apparatus of claim 1, wherein said means for receiving said signal amplitude value only receives those receive signals that exceed a predetermined threshold.

3. The apparatus of claim 1 wherein said phase angle and amplitude information are displayed, one as a function of the other, on a two-axes graphical display device.

4. The apparatus of claim 1 wherein said phase angle and said number of occurrences are displayed, one as a function of the other, on a two-axes graphical display device.

5. A display for graphically displaying receive signal information associated with a metal detector, comprising:
   (a) means for receiving a phase angle value associated with said receive signal;
   (b) means for receiving a signal count of a number of times that the receive signal exceeds a predetermined amplitude threshold at a particular phase angle; and
   (c) microprocessor means for causing said phase angle value and said signal count to appear simultaneously on said display.

6. In a metal detector which generates a receive signal responsive to local magnetic field perturbations, including means for detecting a phase angle value associated with said receive signal the improvement comprising:
   (a) means for detecting a signal count of a number of times that the receive signal exceeds a predetermined amplitude threshold at a particular phase angle; and
   (b) a visual display for simultaneously displaying said phase angle value and said signal count.

7. A display method for graphically displaying receive signal information associated with a metal detector, comprising the steps of:
   (a) displaying a plurality of phase angles simultaneously on a display; and
   (b) displaying on said display said plurality of phase angles simultaneously with a signal count of the number of times that the receive signal exceeds a predetermined amplitude threshold at a particular phase angle.

8. A method of displaying signal information associated with a metal detector, comprising the steps of:
   (a) establishing a receive signal amplitude threshold;
   (b) detecting each occurrence that the receive signal exceeds said threshold;
   (c) counting the number of said occurrences;
   (d) displaying said number of occurrences on a display unit; and
   (e) detecting a phase angle associated with said receive signal when said receive signal exceeds said threshold and simultaneously displaying said phase angle and said number of occurrences.

9. The method of claim 8 wherein said number of occurrences and said phase angle are displayed, one as a function of the other, on a two-axes visual display device.

10. The method of claim 8 wherein said number of occurrences is resolved into a correlative number of predetermined ranges of numbers corresponding to a number of display characters on said display unit.

* * * * *